United States Patent
Schollenberger et al.

(10) Patent No.: US 6,491,176 B1
(45) Date of Patent: Dec. 10, 2002

(54) SEALING VALVE

(75) Inventors: Gerd Schollenberger, Sersheim; Juergen Bauer, Tuebingen; Thomas Schoeck, Renningen, all of (DE)

(73) Assignee: Busak + Shamban GmbH & Co., Stuttgart (DE)

( * ) Notice: Subject to any disclaimer, the term of this patent is extended or adjusted under 35 U.S.C. 154(b) by 0 days.

(21) Appl. No.: 09/485,108

(22) PCT Filed: Aug. 3, 1998

(86) PCT No.: PCT/DE98/02218

§ 371 (c)(1),
(2), (4) Date: Feb. 3, 2000

(87) PCT Pub. No.: WO99/07617

PCT Pub. Date: Feb. 18, 1999

(30) Foreign Application Priority Data

Aug. 6, 1997 (DE) ..................................... 297 14 031 U

(51) Int. Cl.[7] .............................................. B65D 51/16
(52) U.S. Cl. .................. 215/307; 215/311; 220/203.13; 220/203.29; 220/DIG. 27
(58) Field of Search ........................ 220/203.11, 203.13, 220/203.14, 203.23, 203.25, 203.27, 203.29; 367.1, 366.1, 789, 790, 801, 802, DIG. 27; 215/260, 307, 311, 315; 429/53, 54, 185

(56) References Cited

U.S. PATENT DOCUMENTS

| | | | |
|---|---|---|---|
| 2,790,570 A | * 4/1957 | Hodges et al. | ............... 215/315 |
| 3,511,407 A | * 5/1970 | Palma | .................... 220/203.14 |
| 3,516,870 A | * 6/1970 | Horn et al. | ............. 220/203.14 |
| 4,075,399 A | 2/1978 | Sabatino et al. | |
| 4,442,184 A | 4/1984 | Spanur | |
| 4,517,262 A | * 5/1985 | Beidler | ........................ 429/53 |
| 4,658,979 A | * 4/1987 | Mietz et al. | ........... 220/203.14 |
| 5,554,455 A | * 9/1996 | Inoue et al. | ................... 429/54 |
| 5,944,211 A | * 8/1999 | Woodnorth et al. | .... 220/203.13 |

FOREIGN PATENT DOCUMENTS

| | | |
|---|---|---|
| AT | 329 123 | 4/1976 |
| DE | 41 35 711 A1 | 12/1992 |
| EP | 0 193 508 | 9/1986 |
| EP | 0 661 218 | 7/1995 |

* cited by examiner

Primary Examiner—Nathan J. Newhouse
(74) Attorney, Agent, or Firm—Paul Vincent

(57) ABSTRACT

A sealing valve 10 for container openings made from rubber elastic material and having a stopper member 11 which can be introduced into the container opening up to a stopper collar 12 projecting beyond the stopper member 11 in a radial direction 26. At least one control channel 16 is formed on the stopper member 11 and extends in the direction of the longitudinal axis 24 of sealing valve 10 from one end of the stopper member 11 facing an inner region of the container 20. A sealing lip 15 is formed on the stopper collar 11 and can seat in a sealing fashion on a container edge 25 surrounding the container opening. The stopper collar 12 has a control channel section 29 transverse to the control channel 16 of a stopper member 11 which extends this control channel 16 up to the sealing lip 15. A reliable venting is guaranteed while simultaneously securing sealing to prevent the escape of battery liquids. Economical production with large yield is also facilitated.

7 Claims, 1 Drawing Sheet

SEALING VALVE

BACKGROUND OF THE INVENTION

The present invention concerns a sealing valve, made from a rubber elastic material, for container openings having a stopper member which can be introduced into the opening of the container up to a stopper collar projecting in a radial direction beyond the stopper member, wherein at least one control channel is formed on the stopper member which extends in the longitudinal direction of the sealing valve from a lower side of the stopper member up to the stopper collar.

A sealing valve of this kind has become known in the art through DE 41 35 711 C2.

Storage battery cells require sealing valves which reliably prevent the escape of battery acid and $H_2$ gas under normal pressure conditions and which open at a defined excess pressure within the battery cell to facilitate venting. Such storage batteries, in particular lead storage batteries for motor vehicles, are mass-produced articles whose sealing valves must be manufactured as economically as possible.

The control channel of the conventional sealing valve provides a defined flow path for fluids up to a sealing lip. A defined pressure loading of this intended venting location is thereby possible. This leads to an improved, controllable and sensitive response.

AT-B-329 123 describes a sealing valve for storage batteries using another technique for venting the storage battery. In the assembled state, an annular gap is formed between a tubular connector and a stopper body. A vent opening connects the annular gap to the surroundings of the storage battery. The annular gap is subdivided into individual chambers connected to each other via passage openings so that electrolytic particles on the walls of the chambers can be precipitated and their escape prevented or curtailed.

The stopper collar of the conventional sealing valve disclosed in DE 41 35 711 C2 seats on an edge of the container along nearly the entire lower side of the collar. This extensive contact surface can lead to a sticking of the stopper collar to the edge of the container. This impairs the function of the conventional stopper-shaped sealing valve and causes irregularities in its response.

For this reason, the conventional sealing valve disclosed in DE 41 35 711 C2 is preferentially manufactured as a sealing cap, since, in this case, the sealing lip extends and seats in a sealing fashion about the periphery on the outer surface of the container, wherein the control channel ends at the sealing lip.

Problems occur during mass production of this conventional sealing cap disclosed in DE 41 35 711 C2. Separation of the sealing valve from the mould is difficult, since the sealing lip engages behind the mould and removal of the completed sealing valve from the mould is therefore problematic.

It is thereby the technical problem underlying the present invention to further improve the conventional sealing valve disclosed in DE 41 35 711 C2 in such a fashion that a reliable venting and sealing with respect to the escape of battery liquids is guaranteed while simultaneously facilitating economical production with high yield.

SUMMARY OF THE INVENTION

This problem is solved in accordance with the invention in that a sealing lip is formed on the stopper collar which can seat in a sealing fashion on a container edge surrounding the container opening, wherein the stopper collar has a control channel section which is transverse to the control channel of the stopper member to extend the control channel up to the sealing lip.

The sealing valve in accordance with the invention can be easily inserted into the opening of the container so that the sealing lip seats on the container edge. The stopper collar with the sealing lip formed thereon prevents the sealing valve from being inserted too far into the container opening. The sealing lip thereby seats on the edge of the container to guarantee good sealing of the inner region of the container. The extension of the longitudinal control channel in a radial direction leads to defined application of pressure at a certain location of the sealing lip. The defined flow guidance up to the sealing lip assures reproduceable venting of the inside of the container by the stopper-type sealing valve. Sticking and pressing of the stopper collar, which impairs its function, can be prevented.

The following parameters are important for defining the response of the sealing valve: The dimensions of the sealing lip at the stopper collar, the stiffness of the material, and the cross-sectional area of the control channel.

In a preferred embodiment, the sealing lip has at least one prominent sealing edge. The formation of a sealing edge reduces the sealing surface to a sealing line and results in a particularly precise, sensitive and well defined response to changes in pressure within the control channel. In addition, adhesive forces between the sealing edge and the sealing surface at the container edge, which could endanger a proper venting, can be avoided.

A plurality of sealing edges, positioned radially one behind the other, can also be provided to improve the reliability of the seal. A plurality of possible sealing edges also allows the sealing valve in accordance with the invention to be inserted into container openings with which the thickness of the wall of the container connector is subject to tolerance variations. At least one of the possible sealing edges can then seat on the edge of the container to facilitate operation of the sealing valve.

In an additional embodiment, a resilient element is disposed on the outer surface of the stopper member facing away from the container. The resilient element can compensate for tolerances between the sealing valve and a battery cover disposed above the sealing valve. The battery cover applies pressure to the resilient element so that the stopper member is pushed into the container opening to press the sealing lip onto the edge of the container. This bridges differing separations between the battery cover and the stopper member. The resilient element is preverentially disposed in the middle or symmetrically in a central fashion. The application of pressure to the resilient element in a longitudinal direction of the sealing valve allows for even transfer of forces onto the stopper member and the sealing lip. The opening and closing operation of the sealing valve is thereby more reproduceable.

In a first realization of this embodiment, the resilient element is made from a rubber elastic material and/or is formed integrally on the stopper member. Integration of the resilient element on the stopper member precludes need for a separate, external resilient element. The resilient element is present in the produced state and disposed at the optimum position for introduction of forces.

In a second embodiment, the resilient element can also be a helical spring dashed lines 42 of FIG. 2. In this case one can decide, in dependence on the separation between the battery cover and the stopper member, whether or not a separate resilient element (helical spring) should be used and which characteristics it should have. In this manner, the pressure loading of the sealing lip on the edge of the container can be individually adjusted to the application at hand.

In an additional variation of the invention, nubs 40 are provided on the outer peripheral surface of the stopper member. These nubs facilitate engagement and snapping into corresponding recesses 41 in the inner side of the container opening. The sealing valve is then held at a fixed position in the container opening. The nubs can, however, also be used to create a control channel to separate the outer peripheral surface of the stopper member from the inner side of the container opening.

In principle, all rubber elastic materials are suitable for production of the sealing valve in accordance with the invention. However, e.g. fluoroelastomers FPM, FKM as well as silicon rubber materials are preferred.

Further features and advantages of the invention can be derived from the subsequent description of an embodiment of the invention with regard to the drawing, showing details important to the invention, and from the claims. The features can be used in embodiments of the invention individually or collectively in arbitrary combination.

DESCRIPTION OF THE PREFERRED EMBODIMENT

The invention is schematically shown in the figures so that the important features of the invention can be easily recognized. The figures are not necessarily to scale.

Figure 1:
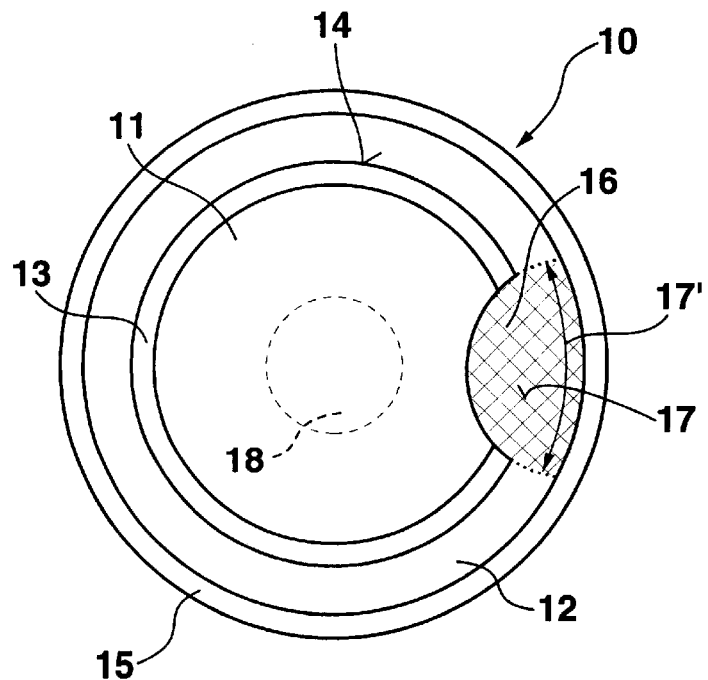
FIG. 1 shows a view of the lower side of a sealing valve in accordance with the invention.

FIG. 1 shows a sealing valve 10 comprising a centrally disposed stopper member 11 and a stopper collar 12 adjacent thereto.

The stopper member 11 can be inserted into a container opening, wherein the stopper member 11 is matched to the size of the container opening. The stopper member 11 maps, via a beveled surface 13, into an outer peripheral surface 14 thereof, which seats on an inner side of the container in the inserted state of the sealing valve 10. (see FIG. 2). The beveled surface 13 facilitates the pressing of a stopper member 11 into the container opening in a slightly compressed manner when the stopper member 11 is somewhat larger than the container opening.

The stopper collar 12 has a peripheral sealing lip 15. A control channel 16 is fashioned into the stopper member 11. The control channel 16 thereby has a cross-sectional surface 17 between the stopper member 11 and the sealing lip 15. The size of the cross-sectional surface 17 influences the function of the sealing valve 10. The defined flow guidance of a fluid having an excess pressure results in a defined application of pressure to the sealing region 17'.

The figure also shows a resilient element 18 formed on the upper side of the stopper member 11 facing away from the container.

Figure 2:
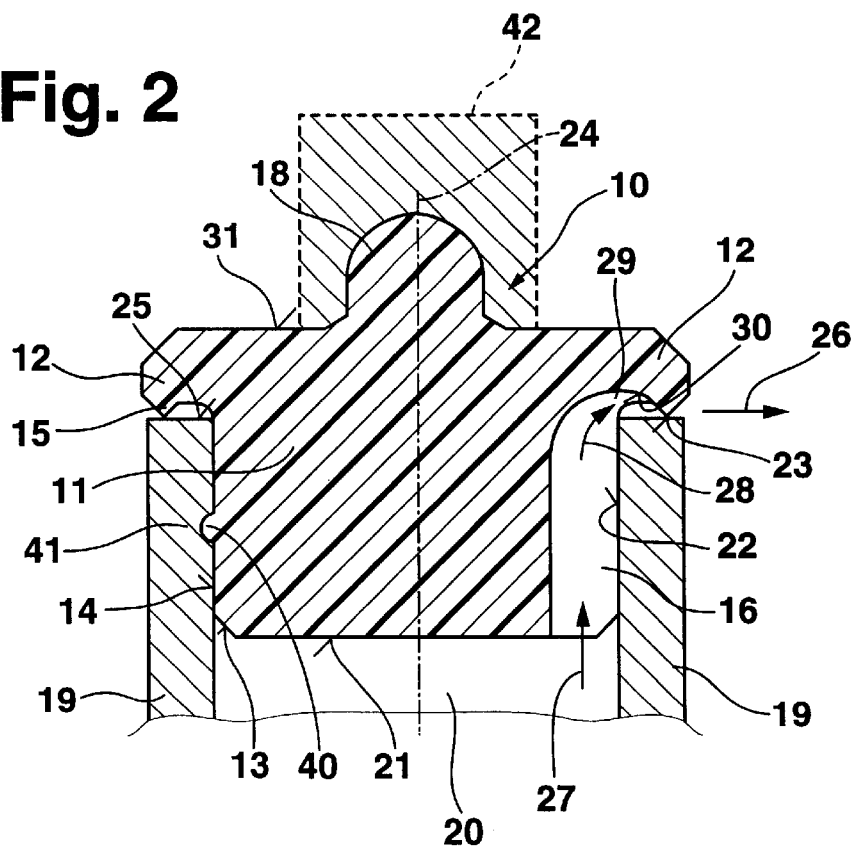
FIG. 2 shows a cross-section through the sealing valve in accordance with FIG. 1, plugged onto a container.

FIG. 2 shows the sealing valve 10 plugged onto a portion of a container connector 19. The stopper member 11 has a beveled surface 13 at its lower side 21 facing an inner volume 20 of the container and the outer peripheral surface 14. When the stopper member 11 is slightly larger than the inner diameter of the container connector 19, the beveled surfaces 13 facilitate an easy insertion of the stopper member 11 into the container opening.

A control channel 16 is disposed proximate the outer peripheral surface 14 of the stopper member 11 and an inner side 22 of the container connector. The control channel 16 effects a defined flow guidance of fluids out of the inner region of the container 20 up to the sealing edge 23. The control channel 16 initially extends from the lower side 21 of the stopper member 11 in the direction of the longitudinal axis 24 of the sealing valve 10. The control channel 16 extends in a radial direction 26 proximate the sealing edge 23 seating on an edge of the container 25. Guidance of the control channel 16 around the container opening via a control channel section 29 leads to a defined localization of pressure at the sealing edge 23, as indicated by arrows 27, 28 and 26.

When the sealing surface 30 is subjected to a defined pressure, the sealing edge 23 is lifted from the edge of the container 25 and fluids can escape from the inner volume via the control channel 16. A reduction in the fluid pressure in the inner region of the container 20 leads to reduction of the pressure acting on the sealing surface 30, so that the sealing edge 23 can once more seat in a sealing fashion on the edge of the container 25.

Operation of the sealing valve 10 is supported by a resilient element 18 disposed between an upper side 31 of a stopper member 11 and a battery cover (not shown). The resilient element 18 bridges the intermediate gap between the stopper member 11 and the battery cover to, in particular, compensate for tolerance fluctuations in the separation between the battery cover and the upper surface 31 of the stopper member 11. The resilient element 18 is disposed on the sealing valve 10 in a central or symmetric position. Loading of the resilient element 18 thereby leads to even loading of the stopper collar 12 and the sealing lip 15.

The sealing valve 10 has only one control channel 16 constituting an intending vent location for fluids inside the container 20. In dependence on the application, a plurality of these types of control channels 16 can be provided for in arbitrary number and configuration. The stopper member 11 can also have a geometrical cross-section other than circular.

A sealing valve 10 made from a rubber elastic material for container openings comprises a stopper member 11 which can be introduced into the container opening up to a stopper collar 12 which projects beyond the stopper member 11 in a radial direction 26. At least one control channel 16 is formed on the stopper member 11 and extends from one end of the stopper member 11 facing an inner region of the container 20 in the direction of the longitudinal axis 24 of the sealing valve 10. A sealing lip 15 is formed on the stopper collar 11 and can seat in a sealing fashion on a container edge 25 surrounding the container opening. The stopper collar 12 has a control channel section 29 which is transverse to the control channel 16 of the stopper member 11 and which extends this control channel 16 up to the sealing lip 15. A reliable venting is guaranteed while simultaneously securing sealing to prevent the escape of battery liquids. Economical production with large yield is also facilitated.

What is claimed is:

1. Sealing and venting valve, made from rubber elastic material, for a container having a container opening, the sealing valve comprising:

a stopper member which can be inserted into the container opening, said stopper member having a first control channel section extending on an outer side of said stopper member parallel to a longitudinal axis thereof from a lower side of said stopper member facing an inner region of the container to an upper end of said stopper member;

a stopper collar integral with said upper end of said stopper member, said stopper collar projecting in a radial direction beyond said stopper member, said stopper collar having a sealing lip formed thereon which seats in a sealing fashion on a container edge surrounding the container opening for normal pressures within the container and which lifts away from the container edge for increased pressure within the container, said stopper collar having a second control channel section communicating with and extending transverse to said first control channel section and up to said sealing lip.

2. The sealing valve of claim 1, wherein said sealing lip has at least one prominent sealing edge.

3. The sealing valve of claim 1, further comprising protruding nubs disposed on an outer peripheral surface of said stopper member.

4. The sealing valve of claim 1, further comprising a resilient element disposed on an outer surface of the said stopper collar facing away from the container.

5. The sealing valve of claim 4, wherein said resilient element is made from a rubber elastic material.

6. The sealing valve of claim 4, wherein said resilient element is integrally formed on said stopper collar.

7. The sealing valve of claim 4, wherein said resilient element comprises a helical spring.

* * * * *